(No Model.) 2 Sheets—Sheet 2.

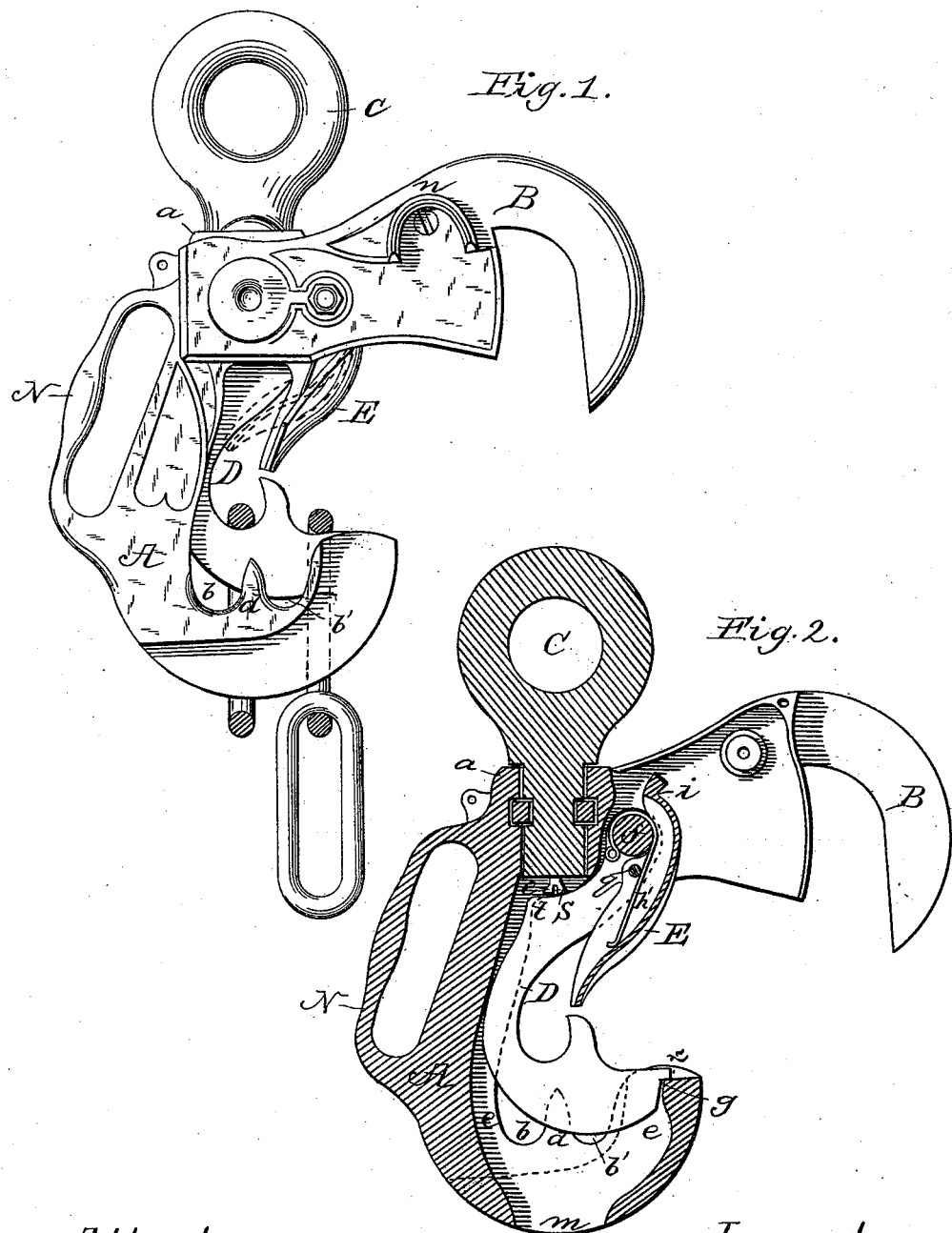

W. K. RAIRIGH.
SAFETY HOOK.

No. 273,310. Patented Mar. 6, 1883.

Attest
R. K. Evans
H. B. Applewhaite

Inventor
Wm K. Rairigh
by J. A. H. Evans & Co.
Attorneys

UNITED STATES PATENT OFFICE.

WILLIAM K. RAIRIGH, OF ST. PETERSBURG, PENNSYLVANIA.

SAFETY-HOOK.

SPECIFICATION forming part of Letters Patent No. 273,310, dated March 6, 1883.

Application filed January 17, 1883. (No model.)

*To all whom it may concern:*

Be it known that I, WM. K. RAIRIGH, of St. Petersburg, in the county of Clarion and State of Pennsylvania, have invented certain Improvements in Safety-Hooks; and I hereby declare the following to be a full, clear, and exact account thereof, reference being had to the accompanying drawings, making part of this specification, in which—

Figure 4:
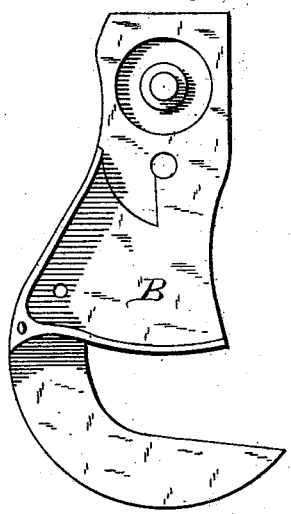
Figure 5:
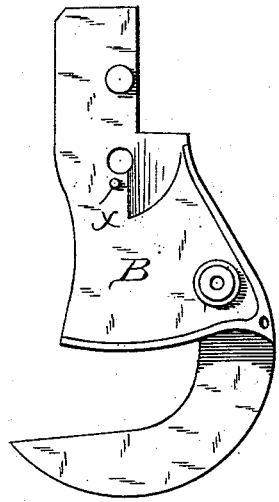
Figure 3:
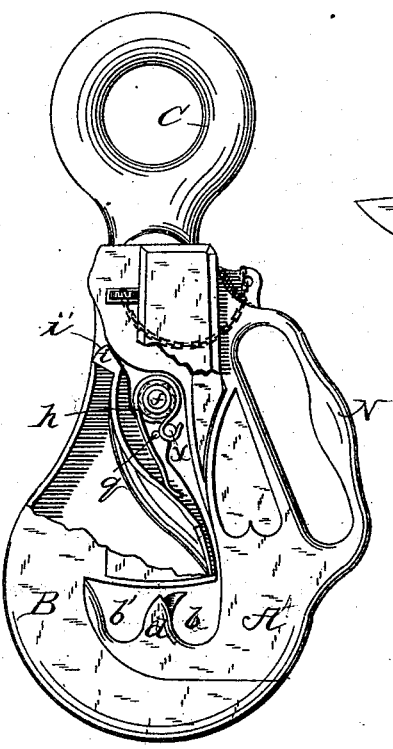
Figure 6:
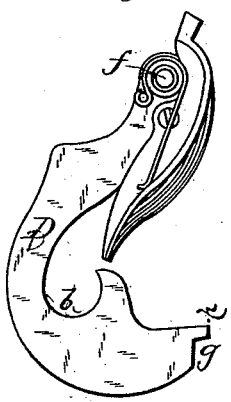

Figure 1 illustrates the hook opened to its greatest extent. Fig. 2 is a vertical section through the hook in the same position. Fig. 3 shows the hook closed, a part of the shell being broken away. Figs. 4, 5, and 6 are details.

My invention relates to safety-hooks having an interior detaching hook or tongue.

My invention is particularly adapted for use in elevators of oil-derricks for drawing tubing, steam-pipes, sucker-rods, &c.; and my invention consists in certain combinations of devices and details of construction, as will be hereinafter fully described, and specifically pointed out in the claims.

In order that those skilled in the art may make and use my invention, I will proceed to describe the manner in which I have carried it out.

The general characteristics of this hook are the same with my improved safety-hook patented January 23, 1883. The heavy or main sustaining-hook A is provided with a head, $a$, to which is secured or pivoted a secondary hook, B, which envelops hook A. In the top of the head is swiveled an attaching-ring, C, the shank of which extends through and is flush with the interior surface of the head. The interior curve of the bend of hook A has in it two curved depressions or recesses, $b \ b'$, and an intervening upwardly-projecting dividing spur or blade, $d$, for a purpose hereinafter described. Through the extent of its longitudinal center hook A is provided with a groove or depression, $e$, within which rests a disengaging-hook, D, which is pivoted to hook B on trunnions $f f$, provided on the outer ends, with screws and nuts. The conformation of the hook D corresponds to that of the hook A, with the exception of its point, where it is provided with a jog or offset, $g$, to ride up and rest upon the point of hook A, as seen in Fig. 2. Coiled around one of the trunnions is a coiled spring, $h$, one end of which is fastened to hook D and the other end to a projection, $x$, on the inside of hook B, so that the constant tendency of said coiled spring is to withdraw hook D from depression $e$ and throw it outward and upward. Immediately below the trunnions $f f$ a pawl or tongue, E, is pivoted, at $q$, to interior hook, D, and projects downwardly toward spur or blade $d$. A spring, $h'$, has its end fastened to hook D, passes over the trunnion, and has its loose end bearing against the inner face of said pawl or tongue, so as to keep a constant pressure on it, forcing it toward the open face of the hook, so that it will act as a keeper to hook $b$ while hook or recess $b'$ is being relieved of its link or ring. On the upper end of pawl E is a curved head or bar, $i$, which rides against the interior surface of hook B as it is opened, and when it is closed rides up into the opening $i'$ between head $a$ and the back of hook B and closes it tightly, so that no dirt can reach the interior of the hook through said opening. That portion of interior hook, D, from the dividing-spur $d$ to its point where the jog is I cut in a straight line to facilitate sliding out of the hook an engaged link or ring. (See Fig. 2.) In the lower end of the shank of ring C is an adjustable screw-stop, $s$, which projects into the upper end of the depression or slot $e$ of hook A. The interior hook, D, has on its back and near its upper end a projection, $t$, which comes in contact with the end of screw $s$ as hook D rides upward as the hook is being opened, and by a positive motion starts hook D forward and relieves it from any gumming or sticking, so spring $h$ can become active and perform its work. The movement of the swiveled shank of ring C will wear off the screw, and as it wears it is withdrawn from time to time, so as to strike projection $t$ at the proper moment. The ring C and shank are swiveled to the hook in the manner shown and described in my patent hereinbefore mentioned. The back of hook A is provided with a handle, N, for manipulating the hook, and hook B has on each side a thumb-and-finger grip, formed by projecting curved ribs $n\ n$.

In order to easily relieve the slot $e$ from any accumulation of dust or dirt which might impede the operation of interior hook, D, I cut an opening or slot, m, from groove or slot e through the bottom of hook A, so the dirt will drop out or be forced out with facility.

It is obvious that when the hook has engaged two links or hooks resting in b and b' the hook can be opened and the link removed from b' without any danger of a link in b being accidentally disengaged. When it is desired to disengage a link or ring from b, the tongue or pawl E is pressed back toward hook A, so as to leave a proper opening, and the link or ring is lifted out of b.

This hook is especially adapted to use in oil-well drilling, but will be found useful for a great variety of purposes.

When the hook is opened, as parts A and B are separated, the interior hook, D, starts upwardly from its position, flush with b b', until the upper surface of the point of hook D comes flush with the upper surface of the point of hook A, and at this moment the projection t comes in contact with the end of screw s, which starts the hook D outward in an arc, of which trunnions f f are the center, and spring h gives it an additional impulse, which throws the jog g over the square point p at the end of the slot in hook A. This acts as a latch or catch and holds the hook open for the removal or insertion of links or rings, the tongue E meantime being kept in such position as to act as a keeper for b, as hereinbefore stated. When the hook is to be closed the interior hook, D, is pressed back toward hook A until the jog drops off of the point p, the hook D is forced back into slot e, and the tongue E is folded against the inner face of A by the trunnions or pivot bearing against its upper end above the pivot q, and the hook assumes the appearance seen in Fig. 3.

Having thus described my invention, what I claim as new, and desire to secure by Letters Patent, is—

1. In a safety-hook, the hook A, provided with a series of independent depressions or hooks, b b', in combination with an interior hook, D, provided with a like series of depressions which lie coincident with b b' when the hook is closed, substantially as set forth.

2. In a safety-hook, the tongue or keeper E, in combination with and pivoted to the interior disengaging-hook, D, and spring h', substantially as described.

3. The hook A, provided with slot e, and interior hook, D, having a projection, t, on its back, in combination with the projecting screw-stop s, inserted in the end of the shank of swiveled ring C, substantially as specified.

4. The main sustaining-hook A, cast with the handle N integral with said hook, as described.

5. In a safety-hook, the main sustaining-hook A, having a groove, e, and a slot, m, opening through the bottom, for the purpose set forth.

6. In a safety-hook, the interior hook, D, provided with a jog or recess, g, adapted to fit over the corner of the point of hook A and hold the safety-hook open, substantially as and for the purpose set forth.

7. In a safety-hook, the interior disengaging-hook, D, having its interior upper edge from the dividing-spur d cut in a straight line, as specified.

8. The interior hook, D, pivoted to hooks A B by trunnions f, and provided with the spring h, in combination with the tongue E, pivoted to said hook at q, and spring h', all constructed, arranged, and operated substantia'ly as and for the purpose set forth.

WILLIAM K. RAIRIGH.

Witnesses:
W. S. BLAKSLEE,
CHAS. H. MARTIN.